United States Patent
Fuhr et al.

(10) Patent No.: US 9,147,865 B2
(45) Date of Patent: Sep. 29, 2015

(54) SYSTEM AND METHOD FOR CLOSING A BATTERY FILL HOLE

(71) Applicant: Johnson Controls Technology LLC, Wilmington, DE (US)

(72) Inventors: Jason D. Fuhr, Sussex, WI (US); Xugang Zhang, Milwaukee, WI (US)

(73) Assignee: Johnson Controls Technology LLC, Wilmington, DE (US)

( * ) Notice: Subject to any disclaimer, the term of this patent is extended or adjusted under 35 U.S.C. 154(b) by 36 days.

(21) Appl. No.: 14/019,439

(22) Filed: Sep. 5, 2013

(65) Prior Publication Data

US 2014/0065451 A1    Mar. 6, 2014

Related U.S. Application Data

(60) Provisional application No. 61/697,547, filed on Sep. 6, 2012.

(51) Int. Cl.

| H01M 2/12 | (2006.01) |
|---|---|
| H01M 2/08 | (2006.01) |
| H01M 2/02 | (2006.01) |
| H01M 10/04 | (2006.01) |
| H01M 2/36 | (2006.01) |
| H01M 2/04 | (2006.01) |

(52) U.S. Cl.
CPC .............. *H01M 2/08* (2013.01); *H01M 2/024* (2013.01); *H01M 2/1235* (2013.01); *H01M 2/365* (2013.01); *H01M 10/0431* (2013.01); *H01M 2/0473* (2013.01); *H01M 2/367* (2013.01); *H01M 2220/20* (2013.01); *Y10T 29/4911* (2015.01)

(58) Field of Classification Search
CPC .............................. H01M 2/365; H01M 2/367
USPC ............................................................ 429/56
See application file for complete search history.

(56) References Cited

U.S. PATENT DOCUMENTS

| 6,045,944 | A | 4/2000 | Okada et al. |
|---|---|---|---|
| 6,117,195 | A | 9/2000 | Honegger |
| 6,190,798 | B1 | 2/2001 | Okada et al. |
| 6,761,996 | B1 | 7/2004 | Kim et al. |
| 7,070,881 | B2 | 7/2006 | Kishiyama et al. |
| 7,241,529 | B2 | 7/2007 | Cho |
| 7,511,941 | B1 | 3/2009 | Gallay et al. |
| 7,666,548 | B2 | 2/2010 | Kim |

(Continued)

FOREIGN PATENT DOCUMENTS

| CN | 2578995 Y | 10/2003 |
|---|---|---|
| CN | 2681358 Y | 2/2005 |

(Continued)

OTHER PUBLICATIONS

International Search Report and Written Opinion for PCT Application No. PCT/US2013/058498 dated Dec. 12, 2013; 9 pgs.

*Primary Examiner* — Jane Rhee
(74) *Attorney, Agent, or Firm* — Fletcher Yoder, P.C.

(57) ABSTRACT

A battery module includes a hermetically sealed battery cell assembly. The battery cell assembly includes a housing and an electrochemical cell disposed in the housing, wherein the housing includes a fill hole configured to receive electrolyte into the battery cell assembly. The battery cell assembly also includes a seal disposed over the fill hole and ultrasonically welded to an annular portion of the housing around the fill hole.

11 Claims, 18 Drawing Sheets

(56) References Cited

U.S. PATENT DOCUMENTS

| | | |
|---|---|---|
| 7,754,378 B2 | 7/2010 | Yim et al. |
| 7,826,197 B2 | 11/2010 | Gramm et al. |
| 8,048,557 B2 | 11/2011 | Brand |
| 8,227,112 B2 | 7/2012 | Suzuki et al. |
| 8,231,991 B2 | 7/2012 | Boucher et al. |
| 8,263,245 B2 | 9/2012 | Kim |
| 2004/0127952 A1 | 7/2004 | O'Phelan et al. |
| 2004/0247995 A1 | 12/2004 | Devitt |
| 2007/0231621 A1* | 10/2007 | Rosal et al. ............... 429/12 |
| 2008/0259525 A1 | 10/2008 | Guillet et al. |
| 2009/0136841 A1 | 5/2009 | Watanabe et al. |
| 2009/0136843 A1 | 5/2009 | Yamamoto et al. |
| 2012/0034511 A1 | 2/2012 | Kitamura |
| 2012/0070722 A1 | 3/2012 | Fukatsu et al. |
| 2013/0115492 A1 | 5/2013 | Aota |

FOREIGN PATENT DOCUMENTS

| | | | |
|---|---|---|---|
| CN | 101079475 B | 4/2010 |
| CN | 101252203 B | 6/2010 |
| CN | 201523031 U | 7/2010 |
| CN | 201673969 U | 12/2010 |
| CN | 101083310 B | 1/2011 |
| CN | 101409332 B | 4/2011 |
| EP | 1244156 B1 | 7/2008 |
| EP | 2436065 B1 | 1/2013 |
| EP | 2479817 B1 | 6/2013 |
| JP | H01151152 A | 6/1989 |
| JP | 8045488 A | 2/1996 |
| JP | 9007558 A | 1/1997 |
| JP | 11025936 A | 1/1999 |
| JP | 11096987 A | 4/1999 |
| JP | 11120966 A | 4/1999 |
| JP | 2000048804 A | 2/2000 |
| JP | 2000123822 A | 4/2000 |
| JP | 2000215883 A | 8/2000 |
| JP | 2000243380 A | 9/2000 |
| JP | 2001057207 A | 2/2001 |
| JP | 2002100329 A | 4/2002 |
| JP | 2003234098 A | 8/2003 |
| JP | 2004006418 A | 1/2004 |
| JP | 2004327451 A | 11/2004 |
| JP | 2004327452 A | 11/2004 |
| JP | 2004327453 A | 11/2004 |
| JP | 2007018915 A | 1/2007 |
| JP | 2007294308 A | 11/2007 |
| JP | 2008010264 A | 1/2008 |
| JP | 2008186712 A | 8/2008 |
| JP | 2009146719 A | 7/2009 |
| JP | 2009301828 A | 12/2009 |
| JP | 2010080140 A | 4/2010 |
| JP | 2011076784 A | 4/2011 |
| JP | 2011076786 A | 4/2011 |
| JP | 2012181991 A | 9/2012 |
| KR | 719734 B1 | 5/2007 |
| KR | 719735 B1 | 5/2007 |
| KR | 2012030934 A | 3/2012 |
| WO | 03010848 A1 | 2/2003 |
| WO | 2012023434 A1 | 2/2012 |

* cited by examiner

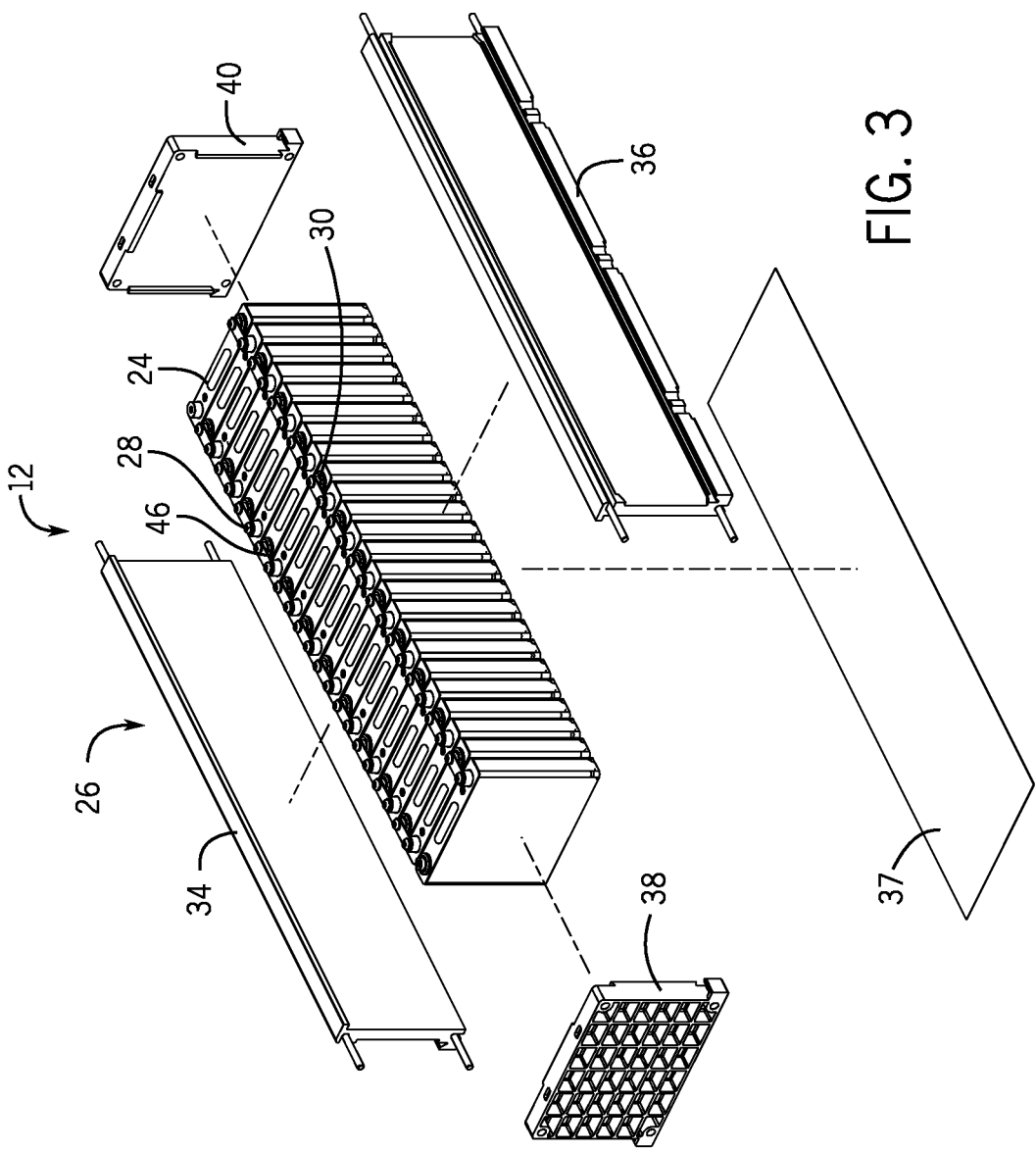

SYSTEM AND METHOD FOR CLOSING A BATTERY FILL HOLE

CROSS REFERENCE TO RELATED APPLICATIONS

This application claims priority from and the benefit of U.S. Provisional Application Ser. No. 61/697,547, entitled "Ultrasonic Welding for Closing the Fill Hole", filed Sep. 6, 2012, which is hereby incorporated by reference.

BACKGROUND

The disclosure relates generally to the field of batteries and battery modules. More specifically, the present disclosure relates to fill hole sealing techniques for battery cells that may be used particularly in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid electric vehicles (PHEVs), and electric vehicle conversions of hybrid electric vehicles and conventional internal combustion engine vehicles.

Vehicles using electric power for all or a portion of their motive power may provide numerous advantages as compared to traditional vehicles powered by internal combustion engines. For example, vehicles using electric power may produce fewer pollutants and may exhibit greater fuel efficiency. In some cases, vehicles using electric power may eliminate the use of gasoline entirely and derive the entirety of their motive force from electric power. As technology continues to evolve, there is a need to provide improved power sources, particularly battery modules, for such vehicles.

Vehicles using electric power for at least a portion of their motive force may derive their electric power from multiple individual prismatic battery cells packaged into battery modules. Such battery cells generally include an electrochemical cell that is held within a housing, and positive and negative battery terminals extending through the housing to carry electrical energy from the battery cell to an outside load. Many existing battery cells also include an electrolyte fill hole for injecting liquid electrolyte into the battery cell during the assembly process. The liquid electrolyte is used to facilitate the internal ion flow between electrodes within the battery cell. Contamination of the electrolyte, heating of the electrolyte, and escape of the electrolyte from the battery cell through the fill hole can cause unwanted corrosion and/or deteriorated performance of the battery cell. For this reason, among others, it is desirable to seal the electrolyte fill hole in a way that protects both the electrolyte and the battery components and enhances the performance of the battery cell.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Present embodiments of the disclosure are related to an electrolyte fill hole seal for use in sealing an electrolyte fill hole to contain and protect an electrolyte within a battery cell. The battery cell includes a housing and an electrochemical cell disposed within the housing. The battery cell also includes the fill hole for injecting the electrolyte into the electrochemical cell, whereby the electrolyte facilitates ion flow between electrodes within the battery cell. The fill hole is hermetically sealed by welding the seal over the fill hole. The weld may be an ultrasonic weld and, in some embodiments, an ultrasonic torsional weld.

Embodiments of the present disclosure are also directed to a method of manufacture of the battery cell with the ultrasonically welded seal over the fill hole. Specifically, the electrolyte may be injected into the cell through the fill hole. The seal may be aligned with the fill hole, and a horn of an ultrasonic welding tool may be aligned over the seal. The horn may exert a pressure on the seal, and acoustic waves may be introduced to ultrasonically weld the seal in place over the fill hole by using the housing of the battery cell as an anvil. Sealing the fill hole as described herein may increase the energy density of the battery cell as compared to battery cells with rivet fill hole seals since the presently disclosed fill hole seal does not extend into the battery cell beyond the housing.

DRAWINGS

These and other features, aspects, and advantages of the present disclosure will become better understood when the following detailed description is read with reference to the accompanying drawings in which like characters represent like parts throughout the drawings, wherein:

FIG. 3 is a partial exploded perspective view of the battery module for use in the vehicle of FIG. 1;

DETAILED DESCRIPTION

The battery system described herein may be used to provide power to various types of electric vehicles and other high voltage energy storage/expending applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. Each individual battery cell may have an electrolyte fill hole for injecting electrolyte into the battery cell to facilitate the internal ion flow between electrodes within the battery cell. The electrolyte fill hole may be sealed by a sealing member that is ultrasonically welded over the electrolyte fill hole. Embodiments of the sealing member and the area of the battery cell surrounding the electrolyte fill hole may vary in shape and size. For example, in some embodiments, the sealing member may take the form of a patch, a hat, or a shaped seal conforming to the geometry of the area surrounding the electrolyte fill hole.

Figure 1:
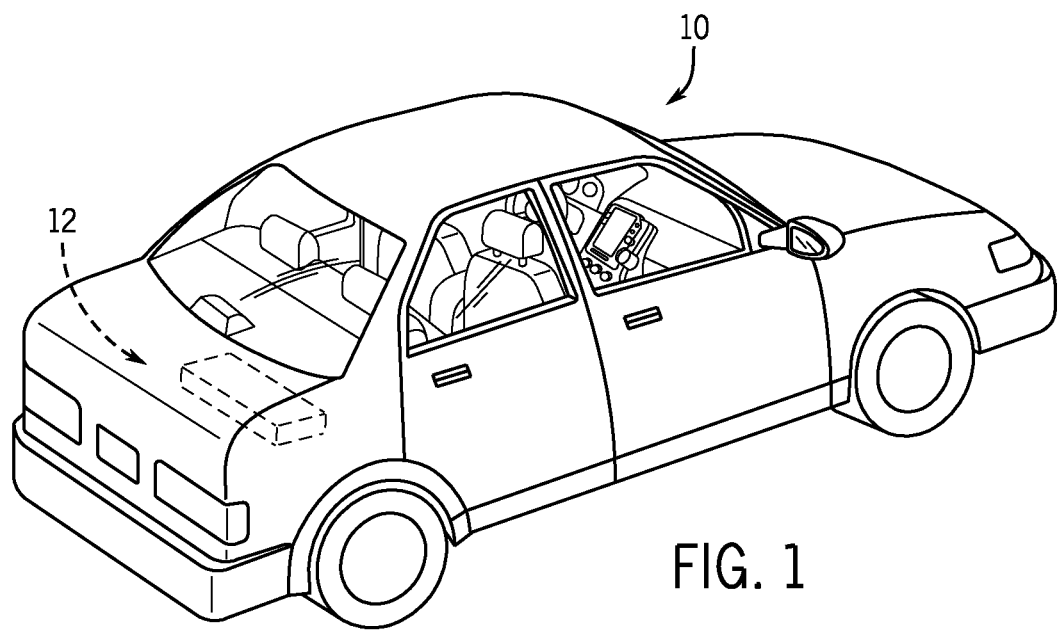
FIG. 1 is a perspective view of an embodiment of a vehicle having a battery module to provide power for various components of the vehicle.

With the foregoing in mind, FIG. 1 is a perspective view of an xEV 10 in the form of an automobile (e.g., a car) having a battery system 12 in accordance with present embodiments for providing a portion of the motive power for the vehicle 10, as described above. Although the xEV 10 may be any of the types of xEVs described above, by specific example, the xEV 10 may be a mHEV, including an internal combustion engine equipped with a microhybrid system which includes a start-stop system that may utilize the battery system 12 to power at least one or more accessories (e.g., AC, lights, consoles, etc.), as well as the ignition of the internal combustion engine, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 12 is illustrated in FIG. 1 as being positioned in the trunk or rear of the vehicle, according to other embodiments, the location of the battery system 12 may differ. For example, the position of the battery system 12 may be selected based on the available space within a vehicle, the desired weight balance of the vehicle, the location of other components used with the battery system 12 (e.g., battery control units, measurement electronics, etc.), and a variety of other considerations.

Figure 2:
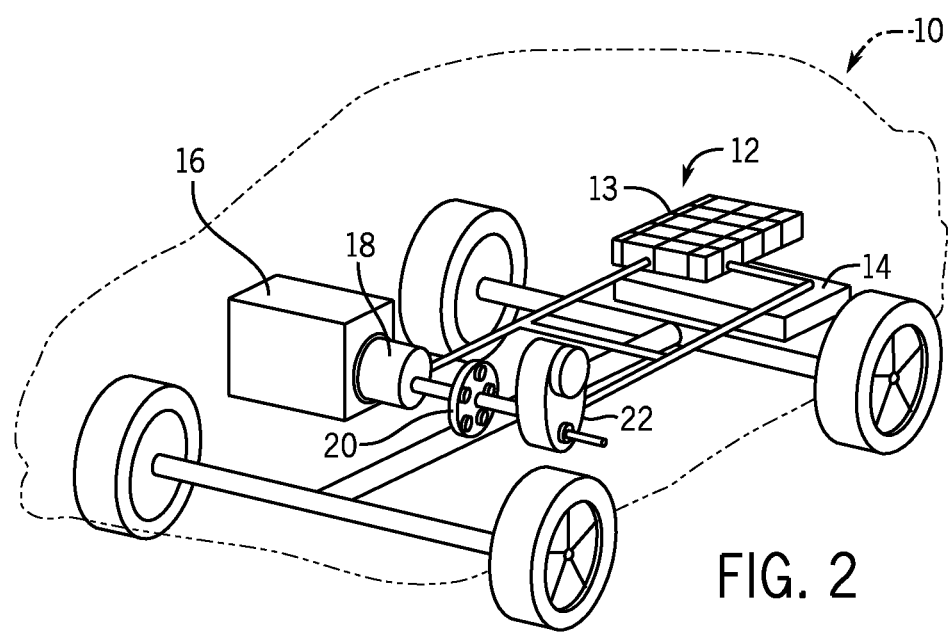
FIG. 2 is a cutaway schematic view of an embodiment of the vehicle and the battery module of FIG. 1.

An xEV 10 may be an HEV having the battery system 12, which includes one or more battery modules 13, as illustrated in FIG. 2. In particular, the battery system 12 illustrated in FIG. 2 is disposed toward the rear of the vehicle 10 proximate a fuel tank 14. In other embodiments, the battery system 12 may be provided immediately adjacent the fuel tank 14, provided in a separate compartment in the rear of the vehicle 10 (e.g., a trunk), or provided in another suitable location in the HEV 10. Further, as illustrated in FIG. 2, the HEV 10 includes an internal combustion engine 16 for times when the HEV 10 utilizes gasoline power to propel the vehicle 10. The HEV 10 also includes an electric motor 18, a power split device 20, and a generator 22 as part of the drive system.

The HEV 10 illustrated in FIG. 2 may be powered or driven by the battery system 12 alone, by the combustion engine 16 alone, or by both the battery system 12 and the combustion engine 16. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 12 and the type of vehicle, among other features, may differ from those shown or described.

One embodiment of a suitable battery module 13 is illustrated in an exploded perspective view in FIG. 3. As shown, the battery module 13 includes a plurality of battery cells 24 that are contained within a battery module shell 26. The battery cells 24 may be, for example, lithium-ion cells, nickel-metal-hydride cells, lithium polymer cells, or other types of battery cells now known or hereafter developed. According to an embodiment, the cells include at least one terminal, such as a positive terminal 28 and/or a negative terminal 30.

The battery cells 24 in the illustrated embodiment are provided side-by-side one another such that a face of the first battery cell 24 is adjacent a face of the second battery cell 24 (e.g., the cells face one another). According to the illustrated embodiment, the cells 24 are stacked in an alternating fashion such that the positive terminal 28 of the first cell is provided adjacent the negative terminal 30 of the second cell. Likewise, the negative terminal 30 of the first cell 24 is provided adjacent a positive terminal 28 of the second cell 24. Such an arrangement allows for efficient connection of the battery cells 24 in series via bus bars. However, the battery cells 24 may be otherwise arranged and/or connected (e.g., in parallel, or in a combination of series and parallel) in other embodiments.

In the illustrated embodiment, the battery module shell 26 for the battery module 13 includes a first side bracket 34 and a second side bracket 36. The shell 26 further includes a first end cap 38 and a second end cap 40. As shown, the end caps 38 and 40 are secured to the side brackets 34 and 36, respectively.

According to one embodiment, the battery cells 24 may be generally prismatic lithium-ion cells configured to store an electrical charge. According to other embodiments, the battery cells 24 may have other physical configurations (e.g., oval, cylindrical, polygonal, etc.). Additionally, in some embodiments, the capacity, size, design, and other features of the battery cells 24 may differ from those shown.

Each battery cell 24 includes a housing 44 through which the battery terminals 28 and 30 extend. In addition, each battery cell 24 includes a fill hole 46 through the housing 44 for injecting electrolyte into the battery cell 24. Traditional battery cells often include a rivet for sealing the fill hole 46 once the electrolyte has been poured into the battery cell 24. This rivet is inserted into the fill hole 46 and activated to crimp around the fill hole 46 on the battery cell housing 44. However, sealing the fill hole 46 in this manner may be associated with a number of drawbacks. For example, the rivet may extend into the battery cell 24, reducing the volume which could otherwise be used for the electrochemical reaction taking place in the battery cell 24. In addition, mechanically activating the rivet, which extends into the fill hole 46, may introduce contaminants from the rivet through the fill hole 46 and into the electrolyte. Laser welding a patch or some other sealing member over the fill hole is another way to seal the cell. However, laser welding may excessively heat the electrolyte within the battery cell 24, which could lead to undesirable operating conditions within the battery cell 24.

As discussed in detail below, present embodiments of the battery cell 24 include a fill hole 46 that is covered and sealed via a piece of metal ultrasonically welded to the battery cell 24. Several embodiments of this type of sealing element are described below. However, it should be understood that variations and combination of the elements shown in the following figures may be used as well for sealing the fill hole 46 without departing from the scope of the present disclosure.

Figure 4A:
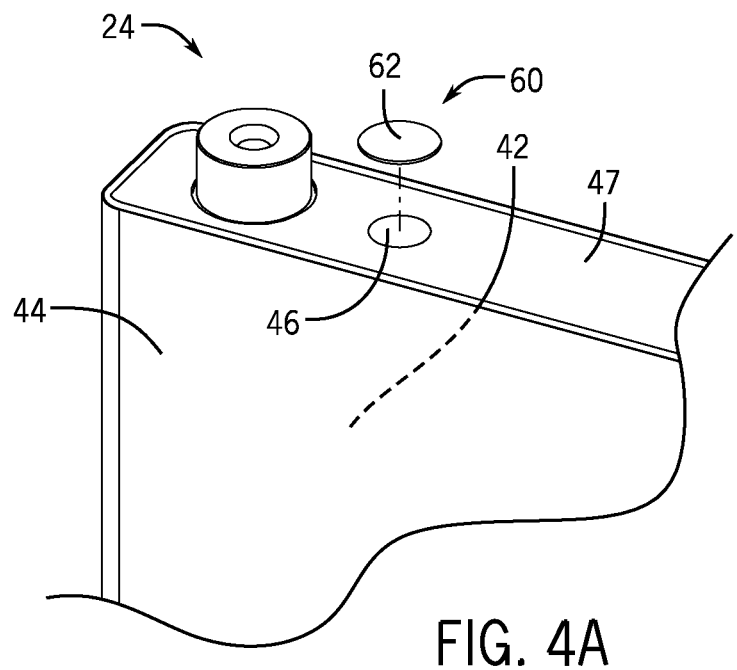
FIG. 4A is a perspective view of an embodiment of a battery cell being assembled for use in the battery module of FIG. 3, the battery cell having a fill hole with a seal that includes a patch.
Figure 4B:
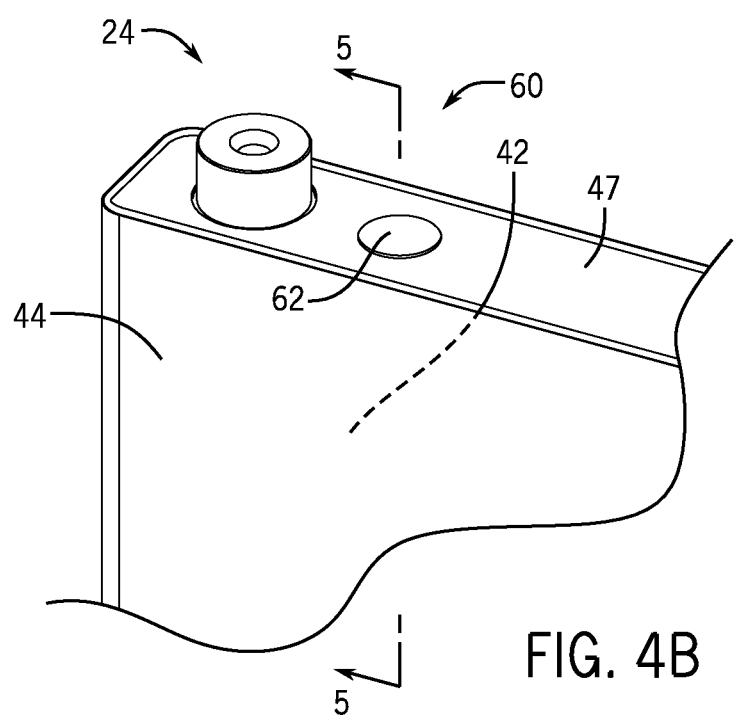
FIG. 4B is a perspective view of an embodiment of the battery cell of FIG. 4A with the fill hole sealed.
Figure 5:
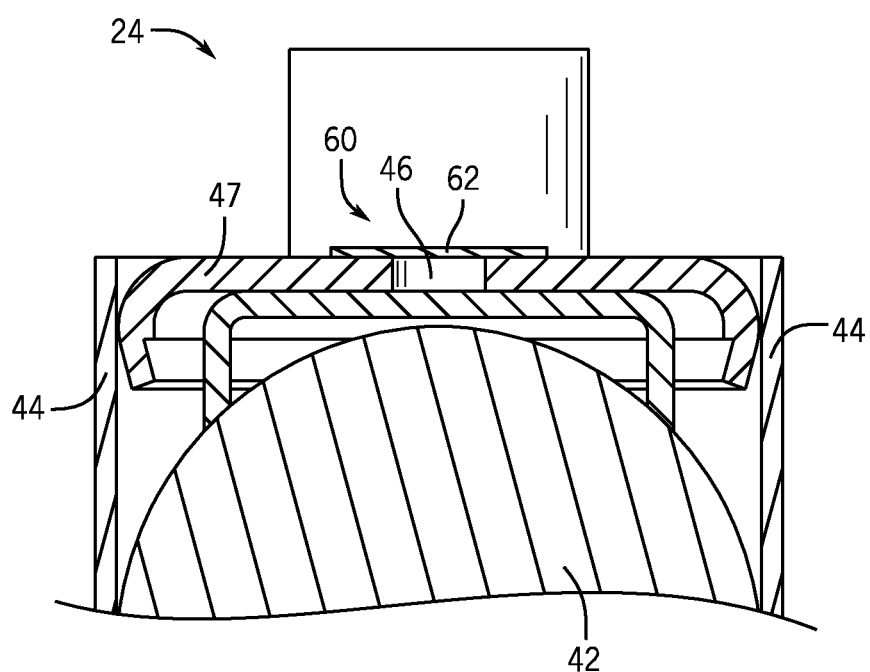
FIG. 5 is a cross sectional view an embodiment of the battery cell of FIG. 4B.

FIGS. 4 and 5 show one such embodiment of the battery cell 24 having the positive terminal 28 and the negative terminal 30 extending from an electrochemical cell 42 disposed within the housing 44 of the battery cell 24. As mentioned above, the housing 44 includes a fill hole 46 located on a lid 47 of the housing 44, through which electrolyte may be injected into the battery cell 24. The battery cell 24 includes a seal 60 that is ultrasonically welded over the fill hole 46. The seal 60 and/or the housing 44 may be composed of either an aluminum or nickel material, for example. In the illustrated embodiment, the seal 60 includes a substantially flat patch 62, which may be ultrasonically welded to the lid 47 of the housing 44 by using the battery cell 24 itself as an anvil.

By employing the patch 62, the volume available for the electrochemical cell 42 is increased, as compared to traditional battery systems that use a rivet seal. This may increase the overall energy density of the battery cell 24 over such conventional methods. Further, by ultrasonically welding the patch 62 to the lid 47 of the housing 44, the amount of heat introduced to the system may be reduced over conventional sealing techniques, which may reduce certain undesirable conditions involved in the assembly and operation processes. It should be noted that the patch 62 may be sealed over the fill hole 46 by ultrasonic torsional welding in a similar manner as described heretofore. Ultrasonic torsional welding may produce less of a normal force on the anvil of the welding process. Therefore, this type of ultrasonic welding may reduce the normal force applied to the battery cell 24 during the assembly process.

Figure 6A:
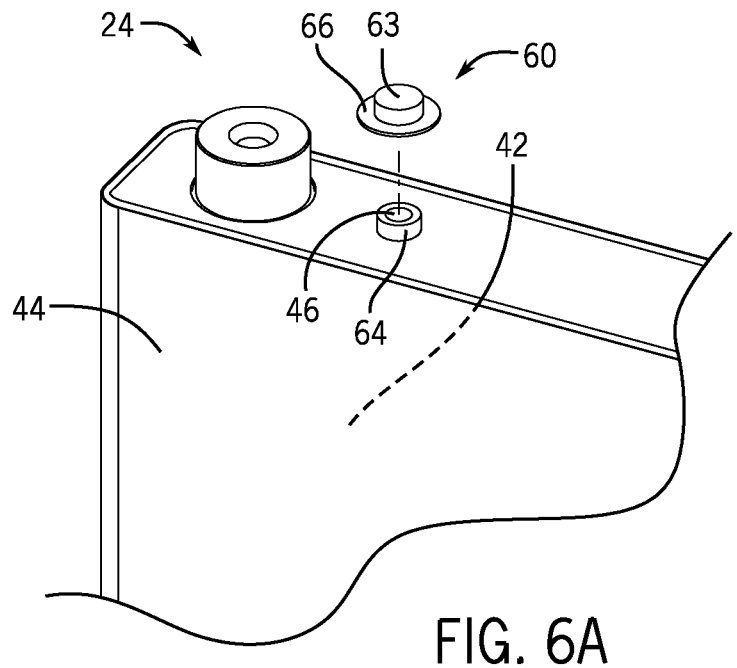
FIG. 6A is a perspective view of another embodiment of a battery cell being assembled for use in the battery module of FIG. 3, the battery cell having a fill hole with a seal that includes a hat.
Figure 6B:
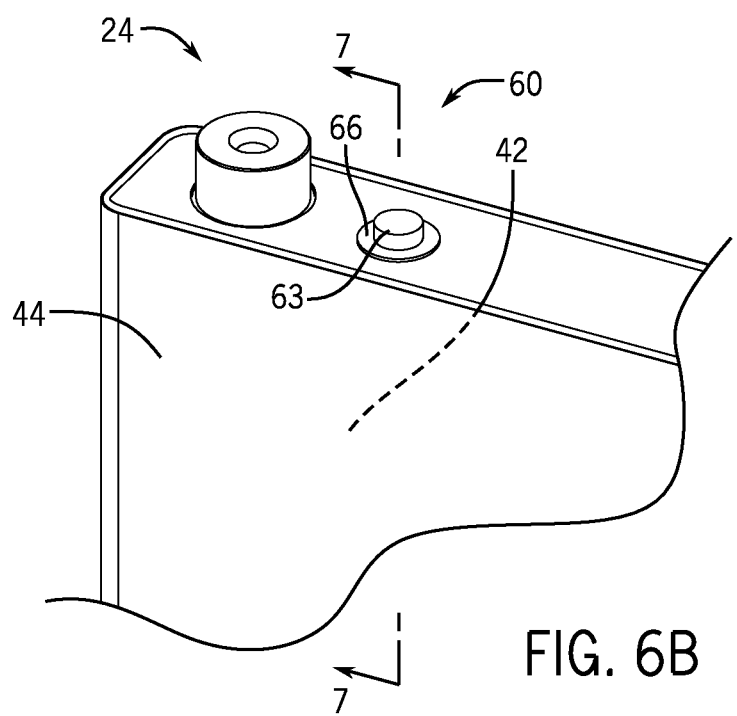
FIG. 6B is a perspective view of an embodiment of the battery cell of FIG. 6A with the fill hole sealed.
Figure 7:
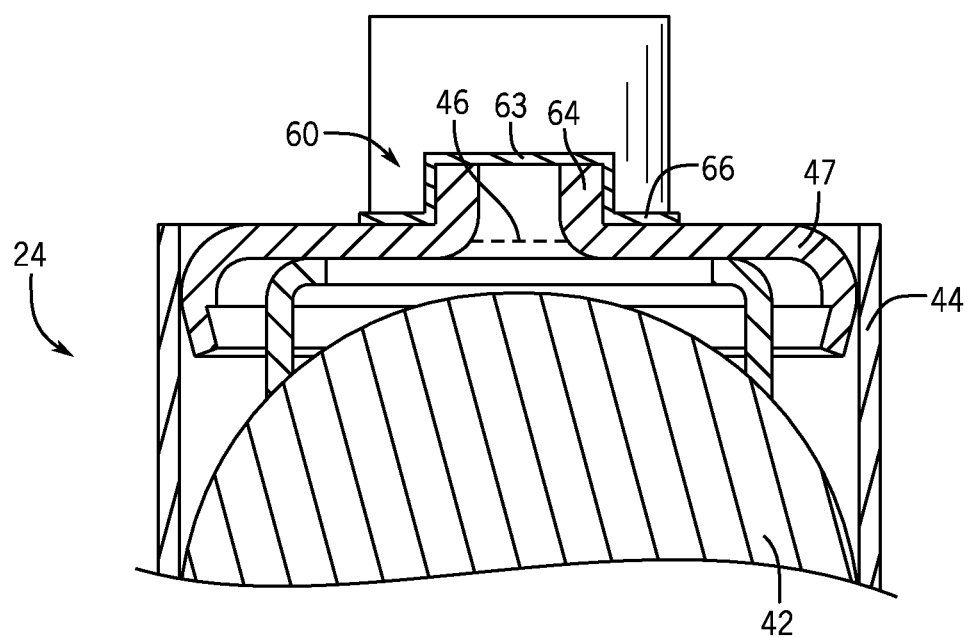
FIG. 7 is a cross sectional view of an embodiment of the battery cell of FIG. 6B.

Other designs and arrangements of the seal 60 may be utilized other than the flat patch 62. As an example, FIGS. 6 and 7 show an embodiment of the battery cell 24 having the fill hole seal 60 in the shape of a hat 63. The hat 63 may be ultrasonically welded in place over a raised portion 64 of the lid 47 on the housing 44. As noted above, this process may involve using the battery cell 24 as an anvil during welding. The hat 63 is a hollow cylindrical piece capped at the top and open at the bottom, whereby an annular lower flat surface 66 (e.g. brim) extends radially outward from the bottom of the hat 63. The lower flat surface 66 located at the bottom of the hat 63 is ultrasonically welded to the lid 47 of the housing 44 such that the hat 63 covers the fill hole 46. The fill hole 46 is encircled by the raised portion 64 of the lid 47 on the housing 44 in the illustrated embodiment. By employing the hat 63, contaminants which may arise from the welding process can be contained outside of the raised portion 64 of the lid 47 and away from the fill hole 46. It should be noted that the hat 63 may be sealed over the fill hole 46 by ultrasonic torsional welding, which may reduce the normal force applied to the battery cell 24 during the welding process, as noted above.

Figure 8A:
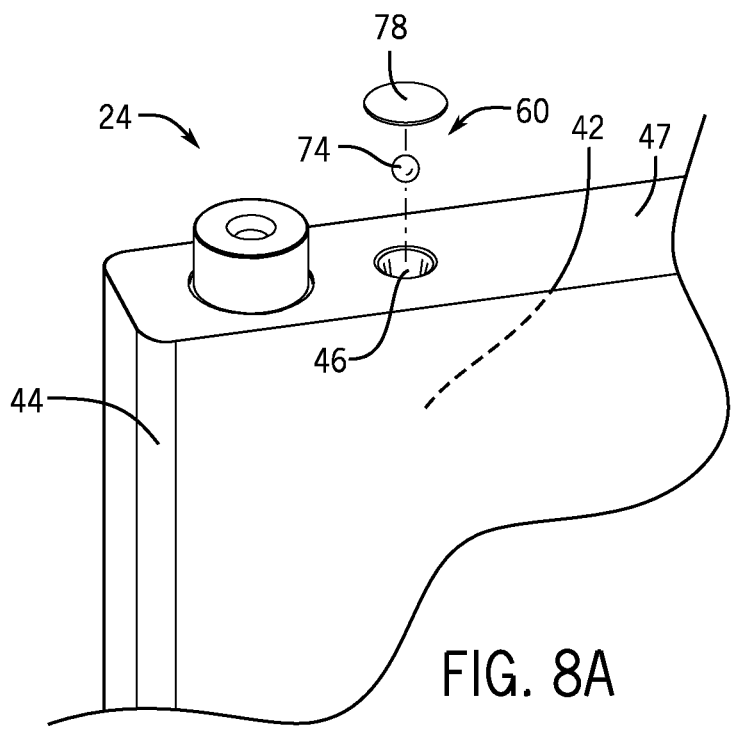
FIG. 8A is a perspective view of another embodiment of a battery cell being assembled for use in the battery module of FIG. 3, the battery cell having a fill hole with a two layer seal.
Figure 8B:
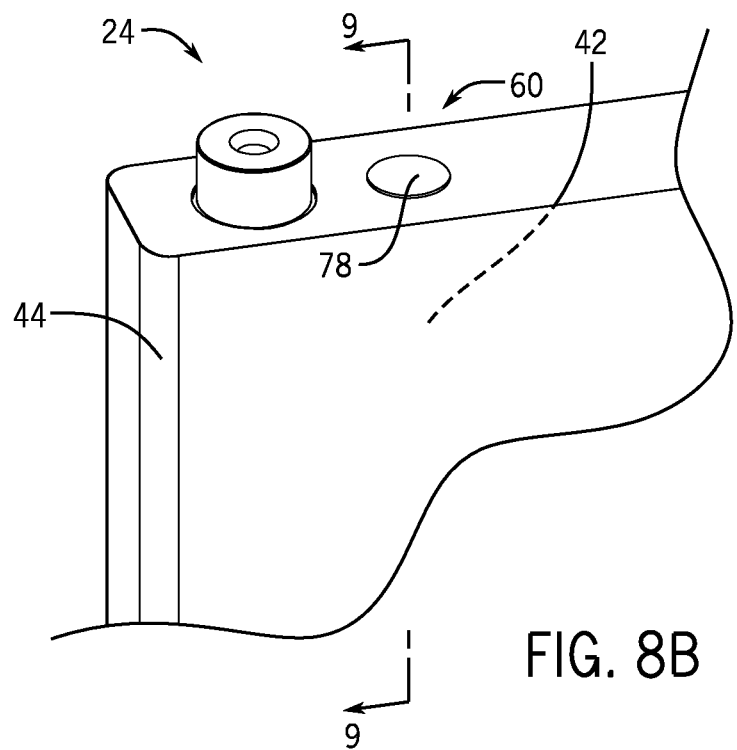
FIG. 8B is a perspective view of an embodiment of the battery cell of FIG. 8A with the fill hole sealed.
Figure 9:
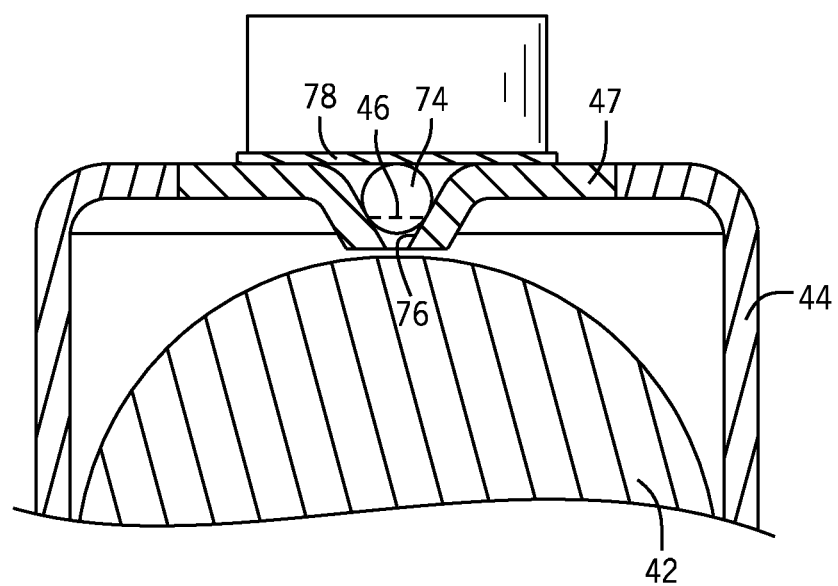
FIG. 9 is a cross sectional view of an embodiment of the battery cell of FIG. 8B.

While FIGS. 4-7 illustrate fill hole seals 60 that provide a single layer seal of the fill hole 46, other embodiments of the present disclosure may provide a greater number of seals. For example, FIGS. 8 and 9 show an embodiment of the battery cell 24 where the fill hole seal 60 includes a two layer seal. In the illustrated two layer seal, a first layer of the seal 60 is provided by a ball or sphere 74 made up of Teflon, aluminum, nickel, or some other suitable material, which may be contained within a conical surface 76 inside the fill hole 46. The conical surface 76 may be a portion of the lid 47 of the housing 44 extending inward into the battery cell 24. The sphere 74 may be welded to the conical surface 76 in the fill hole 46, press fit into the fill hole 46, or otherwise disposed within the fill hole 46. A second layer of the seal 60 in this embodiment is formed by a patch 78, similar to the patch 62 discussed above with reference to FIGS. 4 and 5. The patch 78 may be coupled to the lid 47 of the housing 44 over the fill hole 46 via ultrasonic welding using the battery cell 24 itself as an anvil. Because the sphere 74 is disposed in the fill hole 46, contaminants which may arise from welding the patch 78 to the lid 47 may be kept from entering into the battery cell 24 through the fill hole 46. In some embodiments, the patch 78 may be sealed over the fill hole 46 by ultrasonic torsional welding, which may reduce the normal force applied to the battery cell 24 during the welding process.

Figure 10A:
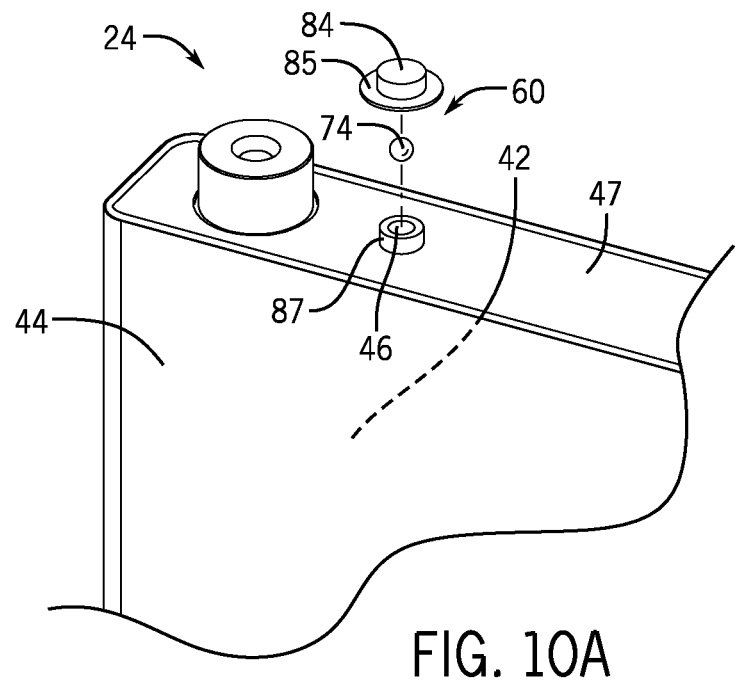
FIG. 10A is a perspective view of another embodiment of a battery cell being assembled for use in the battery module of FIG. 3, the battery cell having a fill hole with another embodiment of a two layer seal.
Figure 10B:
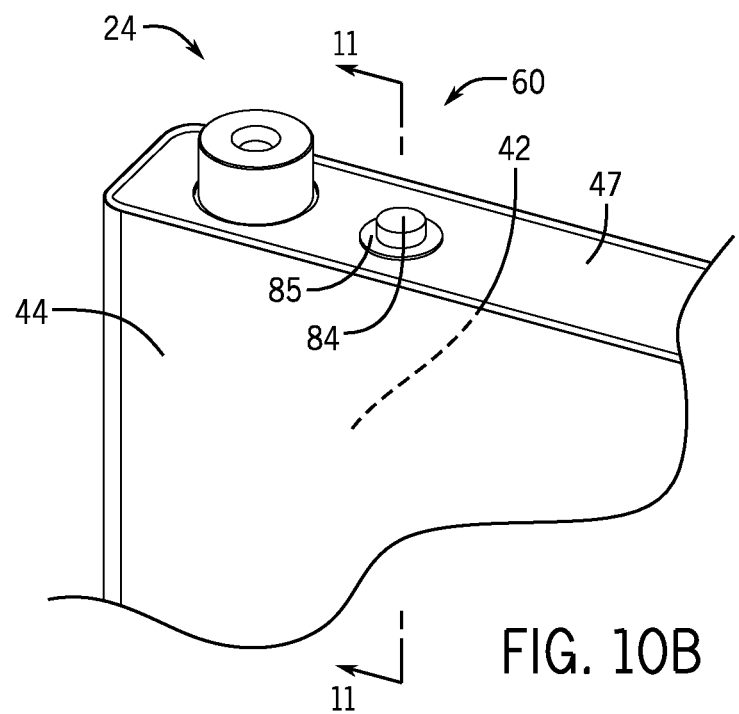
FIG. 10B is a perspective view of an embodiment of the battery cell of FIG. 10A with the fill hole sealed.
Figure 11:
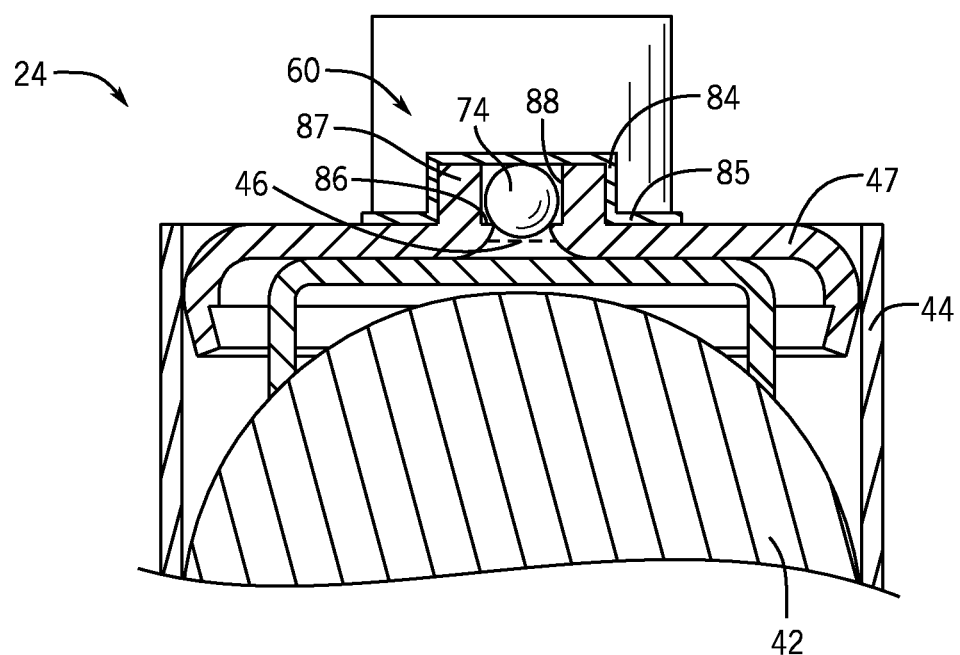
FIG. 11 is a cross sectional view of an embodiment of the battery cell of FIG. 10B.

Other arrangements of double layer seals may be possible as well. FIGS. 10 and 11 show another embodiment of the battery cell 24 having a two layer seal. In this illustrated embodiment, the second layer of the seal 60 includes a hat-shaped cover, or hat 84, similar to the hat 63 discussed with respect to FIGS. 6 and 7. A lower flat surface 85 of the hat 84 is ultrasonically welded to the lid 47 of the housing 44, while the hat 84 is disposed over a raised portion 87 of the lid 47. The battery cell 24 itself functions as an anvil in the ultrasonic welding process. The first layer of the seal 60 includes the sphere 74, as discussed with respect to FIGS. 8 and 9. In this embodiment, however, the sphere 74 is contained inside the raised portion 87 of the lid 47 by a lip 86 extending in a direction substantially perpendicular to an inner surface 88 of the raised portion 87. The sphere 74 may be welded to the lip 86 or to the inner surface 88 of the raised portion 87, press fit into the raised portion 87, or disposed within the raised portion 87 of the lid 47 in some other manner. By positioning the hat 84 over the raised portion 87, contaminants may be kept from entering the fill hole 46 and contained to the outside of the raised portion 87. Additionally, contaminants may be kept from entering the fill hole 46 by way of the first layer of the seal 60, that is, the sphere 74. Again, it should be noted that the hat 84 may be sealed over the fill hole 46 by ultrasonic torsional welding, which may reduce the normal force applied to the battery cell 24 during the welding process.

Figure 12A:
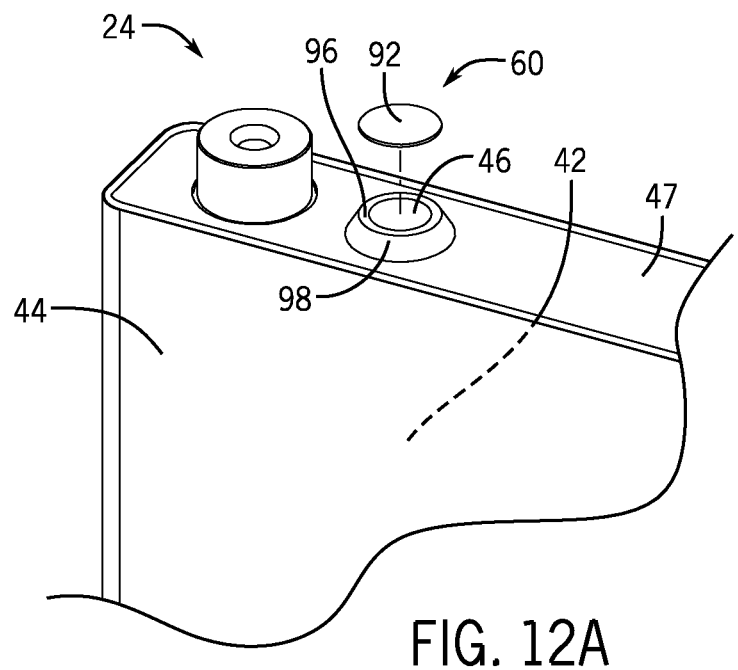
FIG. 12A is a perspective view of another embodiment of a battery cell being assembled for use in the battery module of FIG. 3, the battery cell having a fill hole with a seal that includes a patch and a raised portion of the battery cell.
Figure 12B:
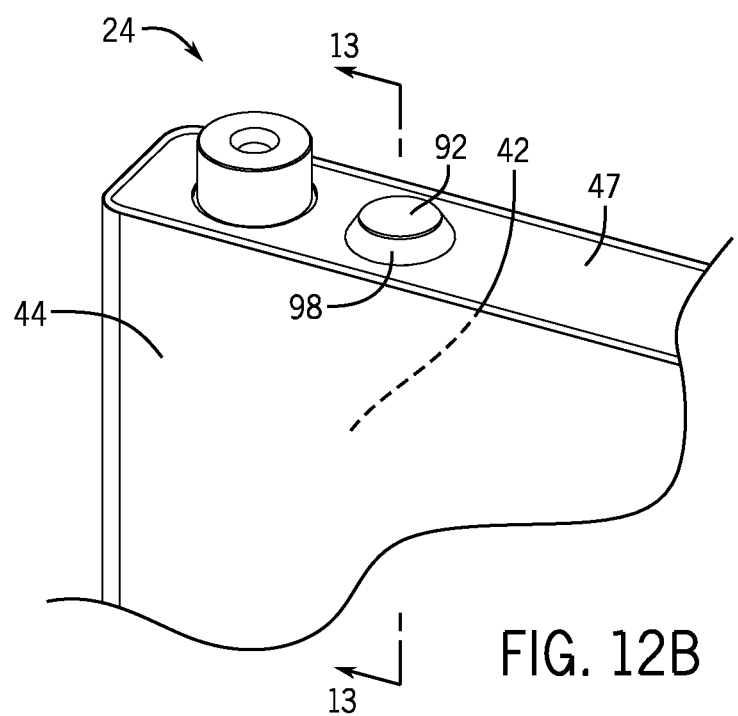
FIG. 12B is a perspective view of an embodiment of the battery cell of FIG. 12A with the fill hole sealed.
Figure 13:
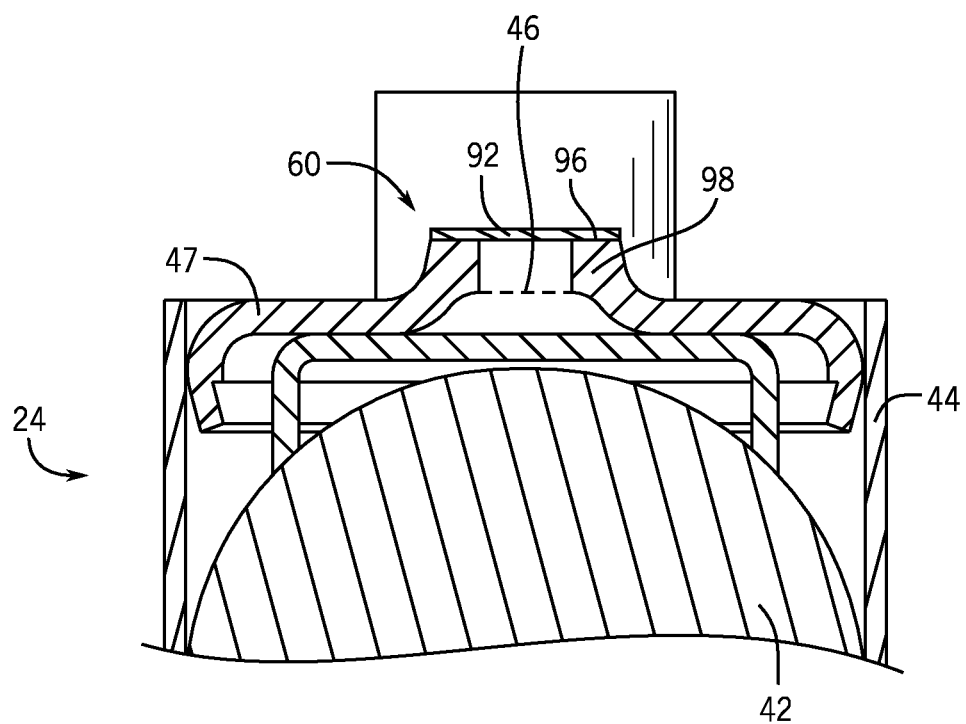
FIG. 13 is a cross sectional view of an embodiment of the battery cell of FIG. 12B.

Several other variations may exist for sealing the fill hole 46. FIGS. 12 and 13 show an embodiment of the battery cell 24 where the seal 60 includes a patch 92 that is ultrasonically welded to an upper surface 96 of a tapered, raised portion 98 of the lid 47. The raised portion 98 may assist in management of a normal force applied to the lid 47 of the housing 44 during the ultrasonic welding process. That is, the raised portion 98 may aid in increasing the local stiffness of the fill hole 46 and may keep the lid 47 from deforming inward into the battery cell 24 during welding. Similar to previous embodiments, the ultrasonic welding of the patch 92 to the upper surface 96 may be performed by using the battery cell 24 itself as an anvil.

It should be noted that, although the illustrated embodiment includes the tapered raised portion 98, other embodiments may include the patch 92 being ultrasonically welded to the upper surface 96 of an elevated portion that is not tapered in the manner depicted in FIGS. 12 and 13. For example, the patch 92 may be welded to the upper surface 96 of an elevated portion that is substantially perpendicular to the flat surfaces of the lid 47 (e.g. similar or to the raised portions 64 and 87 of previously discussed embodiments). Further, it should be noted that in embodiments where the lid 47 features a raised portion (e.g., 64, 87, 98), whether tapered or not, the seal 60 may include a hat-shaped seal that generally conforms to the shape of the raised portion of the lid 47. For example, the tapered, raised portion 98 discussed in the present embodiment may, in other embodiments, be matched with a hat-shaped seal that conforms to the geometry of the elevated portion of the lid 47 (e.g. the hat 63 itself may be tapered). Still further, it should be noted that the patch 92 in the present embodiment may be sealed over the fill hole 46 via ultrasonic torsional welding to reduce a normal force applied to the battery cell 24 during the welding process.

Figure 14A:
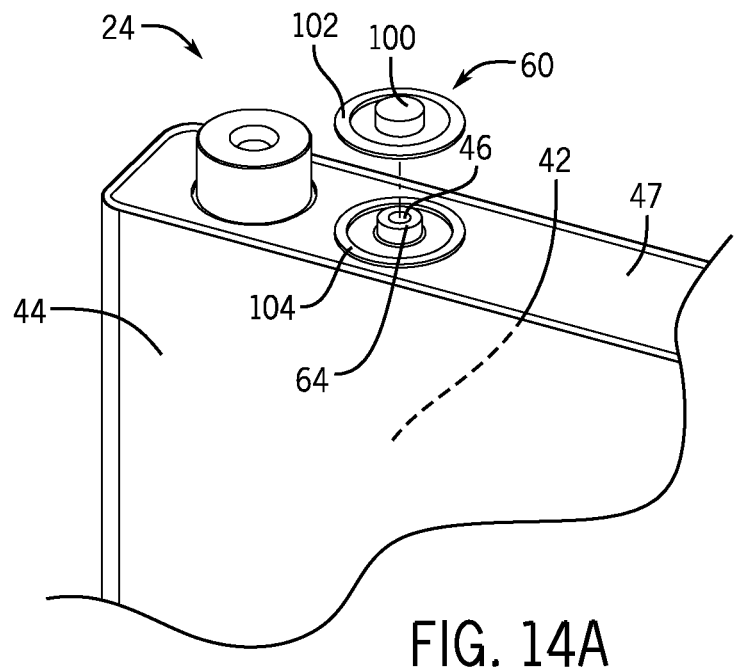
FIG. 14A is a perspective view of another embodiment of a battery being cell being assembled for use in the battery module of FIG. 3, the battery cell having a fill hole with a seal that includes an annular raised portion.
Figure 14B:
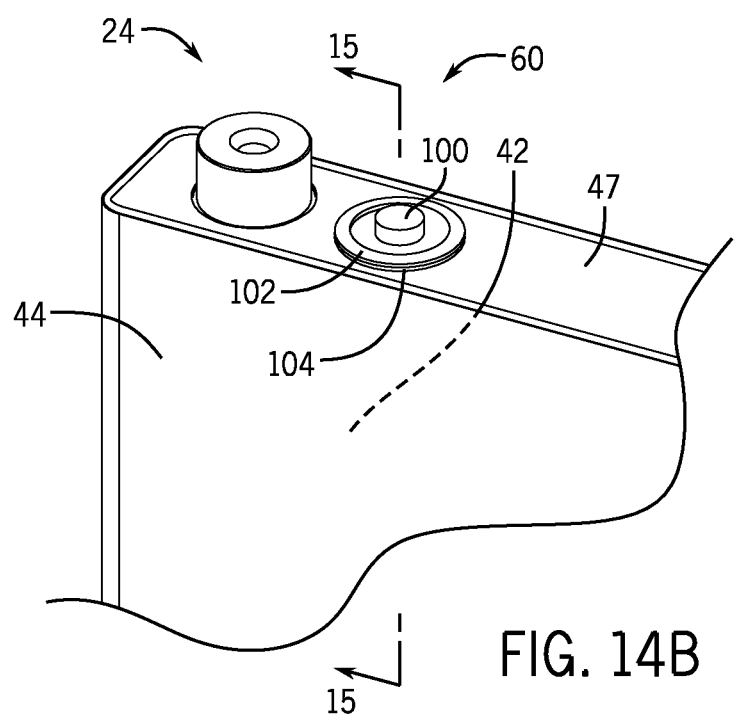
FIG. 14B is a perspective view of an embodiment of the battery cell of FIG. 14A with the fill hole sealed.
Figure 15:
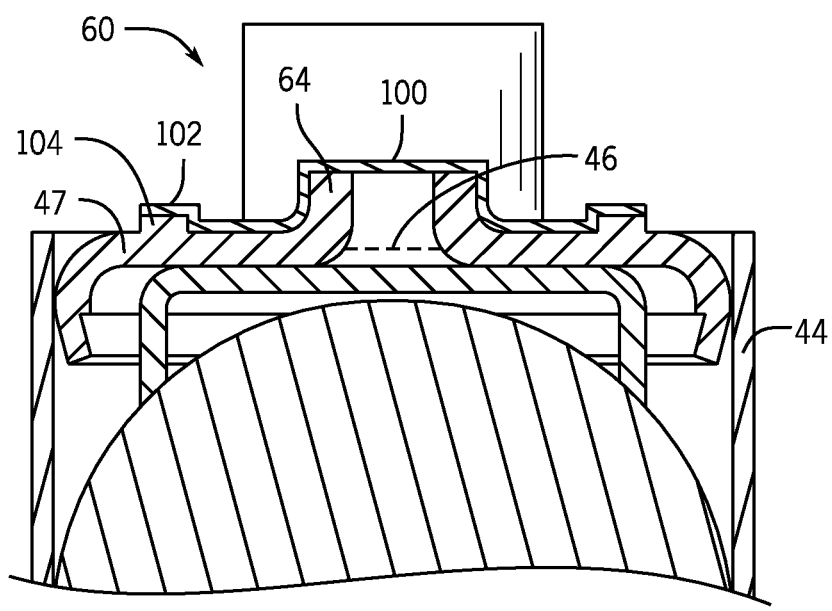
FIG. 15 is a cross sectional view of an embodiment of the battery cell of FIG. 14B.

It should be noted that the seal 60 and the corresponding surface of the lid 47 may take on any number and variations of corresponding shapes for sealing the fill hole 46. FIGS. 14 and 15 show an embodiment of the battery cell 24 having the fill hole 46 covered by a specifically shaped seal 100. The illustrated shaped seal 100 features similar attributes to the hats 63 and 84 discussed in previous embodiments. The shaped seal 100 may have a raised annular surface 102 located radially outward from the center of the shaped seal 100. The raised annular surface 102 may be ultrasonically welded to a raised portion 104 of the lid 47 located radially outward from the fill hole 46. The shaped seal 100 covers the raised portion 64 of the lid 47 as well as the fill hole 46 in a way that conforms to the shape of the lid 47. In the illustrated embodiment, the raised annular surface 102 of the shaped seal 100 may be textured. The corresponding raised portion 104 of the lid 47 may also be textured. The textured surfaces of the raised portion 104 of the lid 47 and/or the raised annular surface 102 of the shaped seal 100 may assist in energy concentration management during the ultrasonic welding process. That is, the acoustic force of the ultrasonic welding process may be concentrated and applied more effectively for binding these textured portions of the battery cell 24 than would be possible on more smooth surfaces. It should be noted that the shaped seal 100 in certain embodiments may be a hat shape, similar to previously discussed embodiments. It should also be noted that the shaped seal 100 may be sealed over the fill hole 46 by ultrasonic torsional welding to further reduce the normal force applied to the battery cell 24.

Figure 16A:
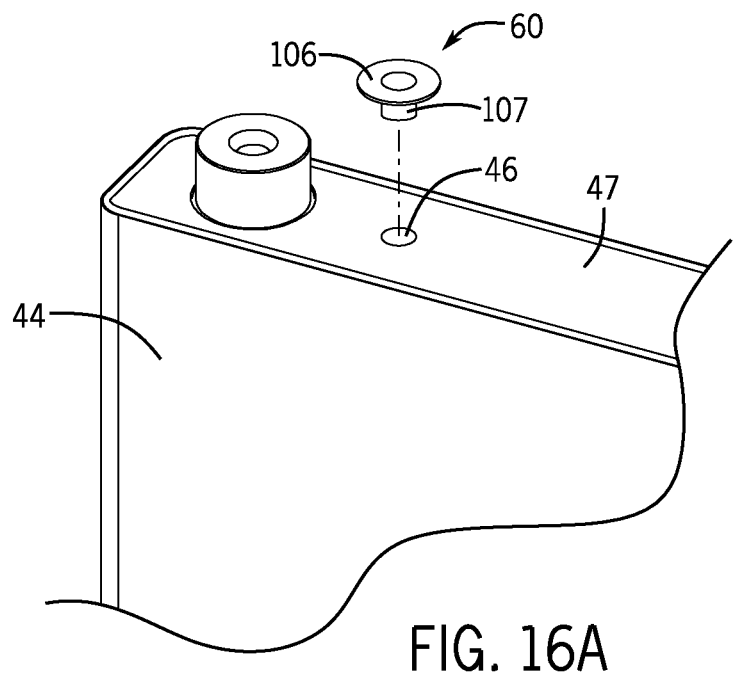
FIG. 16A is a perspective view of another embodiment of a battery cell being assembled for use in the battery module of FIG. 3, the battery cell having a fill hole with a seal that includes a patch with an extension into the fill hole.
Figure 16B:
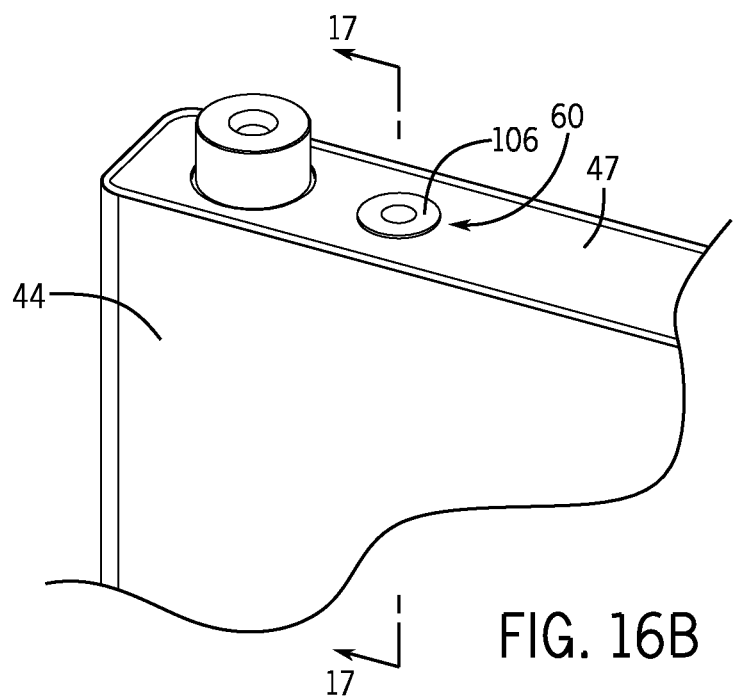
FIG. 16B is a perspective view of an embodiment of the battery cell of FIG. 16A with the fill hole sealed.
Figure 17:
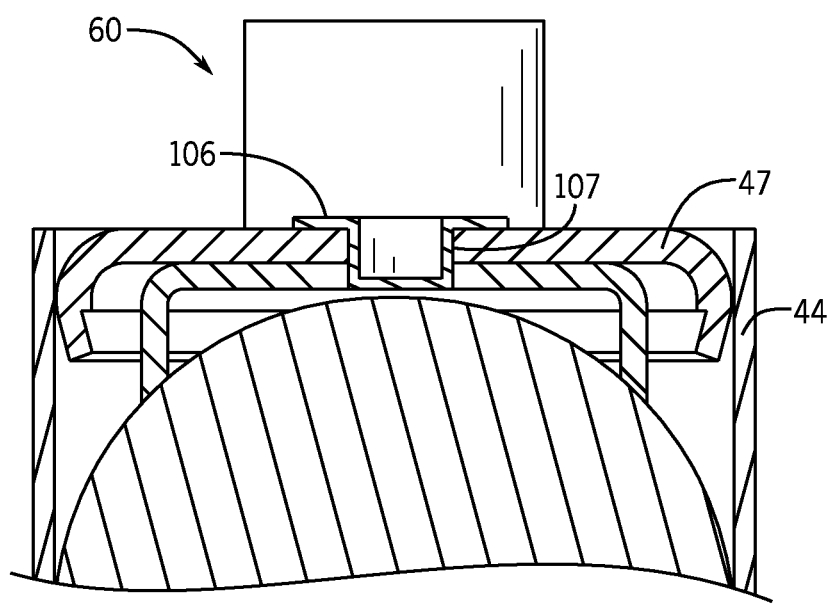
FIG. 17 is a cross sectional view of an embodiment of the battery cell of FIG. 16B.

Another variation of previously discussed embodiments is illustrated in FIGS. 16 and 17. In this embodiment, a patch 106 with an extension 107 is used as the seal 60 for the fill hole 46. The extension 107 may be inserted directly into the fill hole 46. The patch 106 portion may then be ultrasonically welded to the lid 46 of the housing 44 using the battery cell 24 as the anvil. The extension 107 may be inserted into the fill hole 46 in such a way that the extension 107 does not extend beyond the bottom of the lid 47. In this way, the extension 107 may serve to seal the fill hole 46 without decreasing the volume available for the electrochemical cell 42 disposed within the housing 44. It should be noted that the patch 106, with the extension 107 inserted into the fill hole 46, may be sealed over the fill hole 46 by ultrasonic torsional welding to further reduce the normal force applied to the battery cell 24.

An additional feature of each of the previously discussed embodiments is that the fill hole seal 60 may be used as a pressure vent in certain contents. By using ultrasonic welding techniques, the seal 60 may be configured in such a way that the fill hole 46 itself may be designed larger than would be possible with a rivet seal. By enlarging the fill hole 46, the seal 60 may be designed such that the seal 60 gives way when a pressure difference between the battery cell 24 and the surrounding atmosphere reaches a certain threshold. Based on the desired pressure threshold, the arrangement, shape, size, and specific texturing of the housing 44, the fill hole 46, and the seal 60 may be tailored to facilitate venting of the battery cell 24 through the fill hole 46 at the desired vent pressure.

Figure 18:
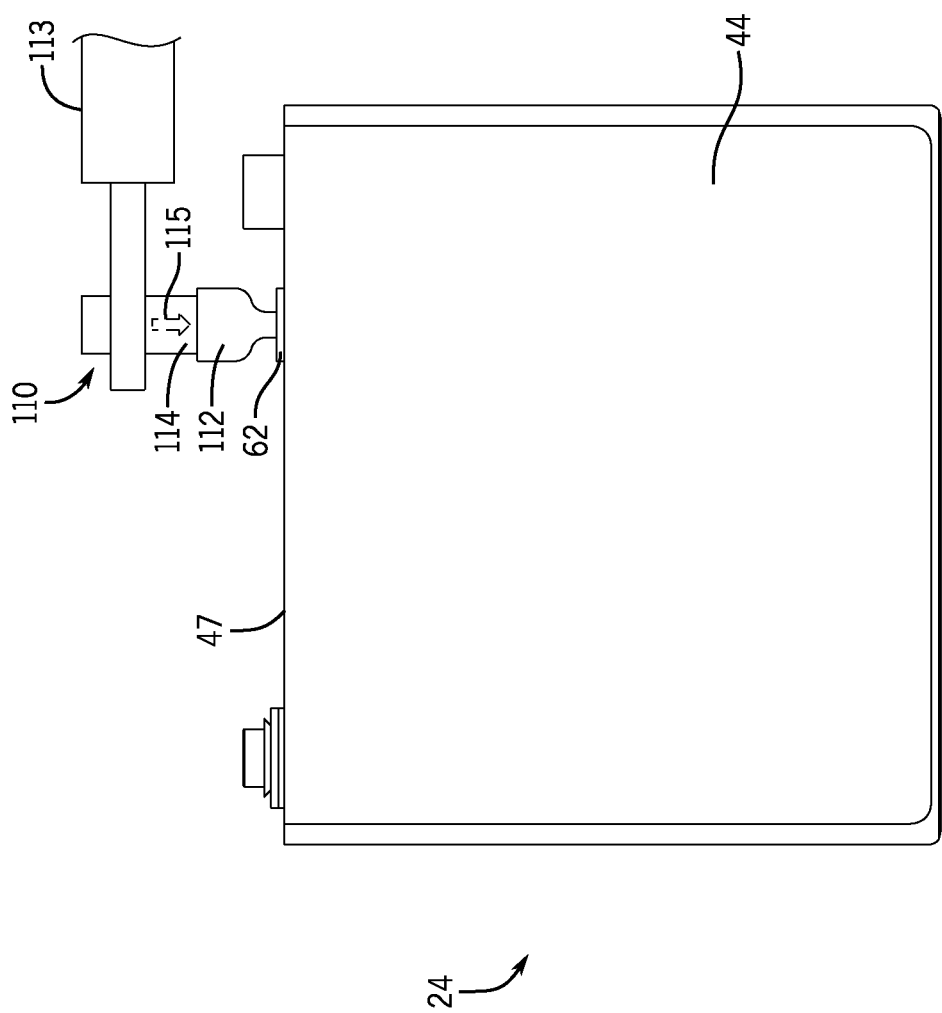
FIG. 18 is a front view of an embodiment of an ultrasonic welding tool being used to ultrasonically weld a seal to a battery cell.

In each of the previously introduced embodiments of FIGS. 4-17, the fill hole 46 is covered with the seal 60 that is ultrasonically welded to the lid 47 of the housing 44. FIG. 18 shows an embodiment of an ultrasonic welding tool 110 that may be used to assist in assembling the aforementioned battery cells 24. The ultrasonic welding tool 110 in the illustrated embodiment, includes a horn 112, ultrasonic converters 113 and a booster 114. Ultrasonic welding tools 110 often include an anvil, and the materials that are intended to be welded together are placed on top of the anvil. The materials are generally pressed between the horn 112 and the anvil. In the present embodiment, however, the battery cell 24 itself is used as the anvil. The ultrasonic welding tool 110 exerts a pressure indicated by an arrow 115 on the materials between the horn 112 and the battery cell 24, in this case the patch 62 and the lid 47 of the housing 44. The ultrasonic converter 113 converts an electrical signal into a mechanical vibration, the booster 114 modifies the vibrations to a desired amplitude, and the horn 112, or sonotrode, introduces the vibrations which ultrasonically weld the patch 62 to the lid 47. It should be noted that the ultrasonic welding tool 110 may employ an ultrasonic torsional weld in the same or similar manner as discussed herein. As noted above, the normal, downward pressure (e.g., arrow 115) exerted on the battery cell 24 using a torsional ultrasonic welding process may be less than the pressure applied by other ultrasonic welding processes. The ultrasonic welding tool 110 may be used for any of the previously discussed seals 60.

Figure 19:
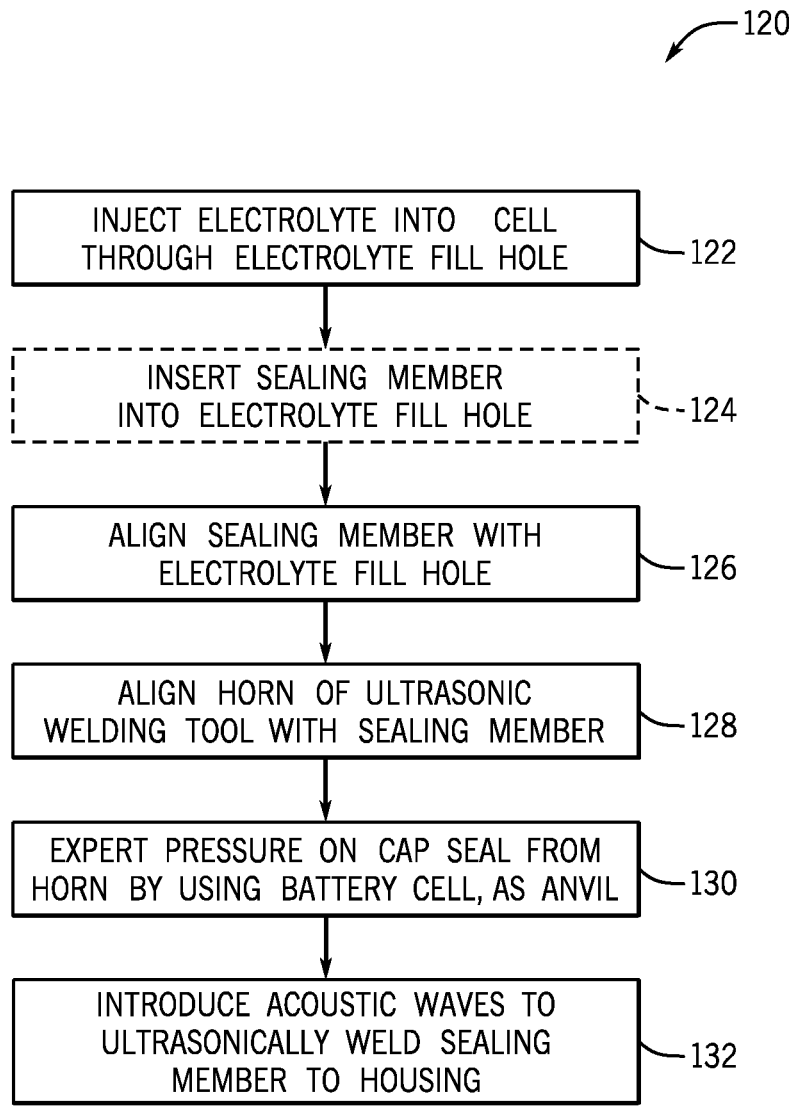
FIG. 19 is a process flow diagram of an embodiment of a method of manufacturing a battery cell using the ultrasonic welding tool of FIG. 18.

FIG. 19 illustrates a method 120 for sealing the fill hole 46 in accordance with embodiments of the present disclosure. The electrochemical cell 42 is disposed within the housing 44, and electrolyte is injected into the fill hole 46 located on the lid 47 of the housing 44, as shown in block 122. It should be noted that in other embodiments, the fill hole 46 may be located on a bottom portion of the housing 44 as well. In embodiments with a two layer seal, the sphere 74 may be inserted into the fill hole 46 to form the first layer, as represented in block 124. In one embodiment, the sphere 74 may be contained by the conical surface 76 located within the fill hole 46. In another embodiment, the sphere 74 may be contained by the lip 86 inside the raised portion 87 of the lid 47, above the fill hole 46. A sealing member of the seal 60 is aligned with the fill hole 46 such that the sealing member can be ultrasonically welded in place over the fill hole 46, as shown in block 126. The sealing member may include any one of the patches, hats, or other shaped sealing member used for the seals 60 discussed at length above. Aligning the seal member, may involve disposing the sealing member in its intended location (e.g. the hat 63 over the raised portion 64 of the lid 47). The horn 112 of the ultrasonic welding tool 110 is aligned over the sealing member and fill hole 46, as shown in block 128. Pressure is exerted by the horn 112 onto the sealing member using the battery cell 24 as the anvil, as represented by block 130. In some embodiments, such as when the seal 60 includes the hat 63, the pressure may be exerted on the lower flat surface 66 of the hat 63. Acoustic waves are introduced by the horn 112 to ultrasonically weld a portion of the sealing member to the housing 44 of the battery cell 24, as shown in block 132. Generally, this refers to an annular portion toward the outer edge of the sealing member, but in other embodiments may include other portions of the sealing member. It should be noted that the illustrated method may be performed using ultrasonic torsional welding to seal the fill hole 46 of the housing 44.

While only certain features and embodiments of the invention have been illustrated and described, many modifications and changes may occur to those skilled in the art (e.g., variations in sizes, dimensions, structures, shapes and proportions of the various elements, values of parameters, mounting arrangements, use of materials, orientations, welding time and amplitude etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes that fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method for manufacturing a battery cell, comprising:
   disposing a sealing element over an annular portion of a housing of the battery cell, wherein the housing comprises a fill hole extending through the housing and the annular portion surrounds the fill hole;
   aligning a horn of an ultrasonic welding tool with the sealing element disposed over the annular portion;
   exerting a pressure on the sealing element while using the battery cell as an anvil, via the horn of the ultrasonic welding tool; and
   ultrasonically welding the sealing member element to the annular portion of the housing, via the ultrasonic welding tool.

2. The method of claim 1, comprising generating an internal seal of the fill hole via a ball disposed in contact with a surface of the housing below the annular portion.

3. The method of claim 1, wherein ultrasonically welding the sealing element to the annular portion of the housing comprises introducing acoustic waves from a lower surface of the horn.

4. The method of claim 1, comprising injecting electrolyte through the fill hole and into the battery cell.

5. The method of claim 1, wherein the ultrasonic welding tool comprises an ultrasonic torsional welding tool.

6. The method of claim 1, wherein disposing the sealing element over the annular portion of the housing comprises disposing a hat-shaped sealing element over a raised portion of the housing such that a lower surface of the hat-shaped sealing element contacts the annular portion of the housing, and wherein ultrasonically welding the sealing element to the annular portion of the housing comprises ultrasonically welding the lower surface of the hat-shaped sealing element to the annular portion of the housing.

7. The method of claim 1, wherein the annular portion of the housing is an upper surface of a raised portion of the housing, wherein ultrasonically welding the sealing element to the annular portion of the housing comprises ultrasonically welding the sealing element to the upper surface of the raised portion of the housing.

8. The method of claim 1, wherein the sealing element is a substantially flat patch.

9. The method of claim 1, wherein the sealing element is a shaped seal comprising a raised annular surface, wherein ultrasonically welding the sealing element to the annular portion of the housing comprises ultrasonically welding the raised annular surface of the shaped seal to the annular portion of the housing.

10. The method of claim 9, wherein the annular portion of the housing is also raised upwardly from the housing and toward the raised annular surface of the shaped seal.

11. The method of claim 1, wherein the annular portion of the housing is disposed on a lid of the housing.

\* \* \* \* \*